Figure 1:
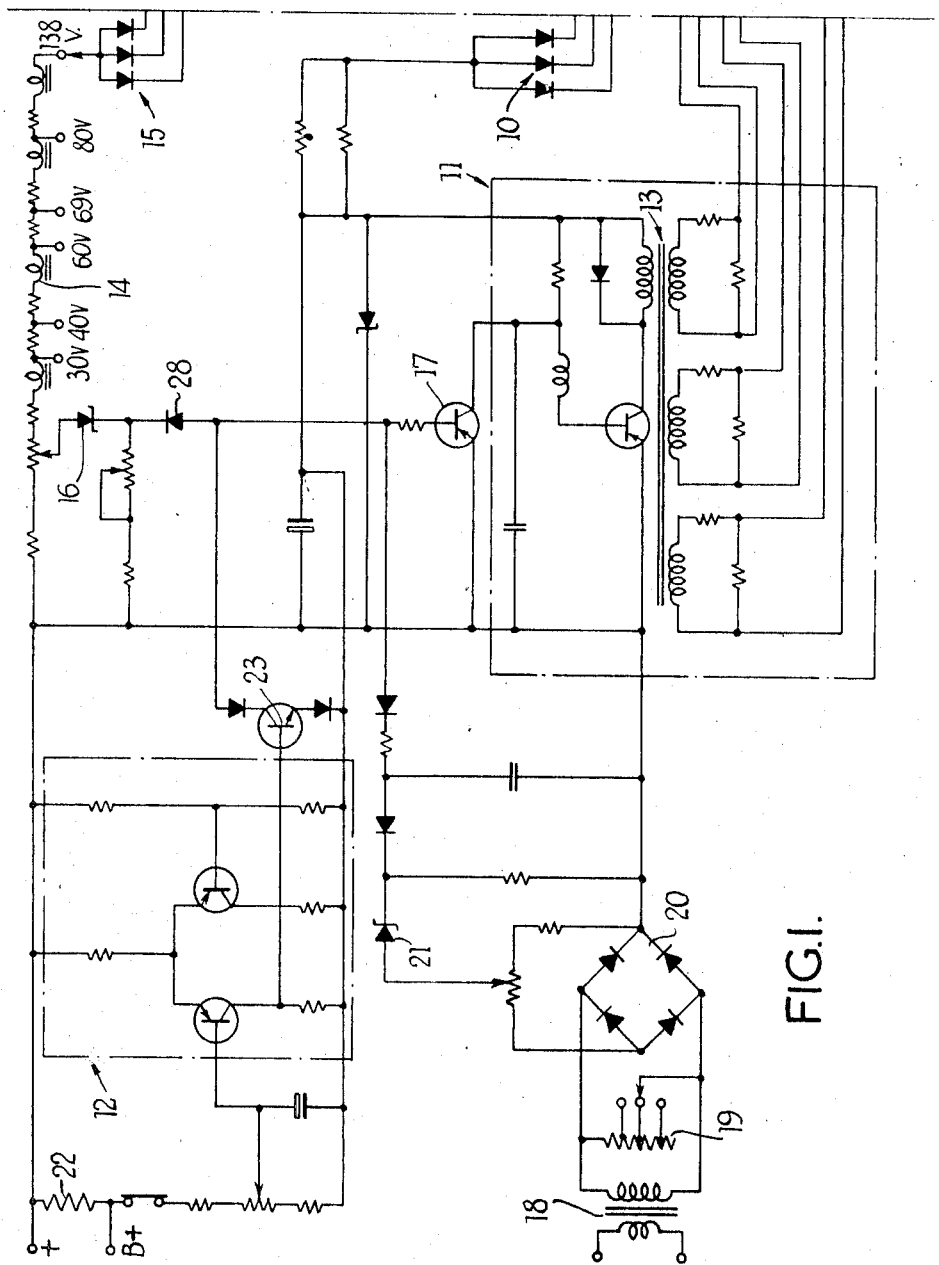

United States Patent

[11] 3,599,080

| [72] | Inventor | David Bennett |
| | | Northfleet, England |
| [21] | Appl. No. | 881,214 |
| [22] | Filed | Dec. 1, 1969 |
| [45] | Patented | Aug. 10, 1971 |
| [73] | Assignee | Stone-Platt Crawley Limited |
| | | Crawley, Sussex, England |
| [32] | Priority | Dec. 2, 1968 |
| [33] | | Great Britain |
| [31] | | 57,094/68 |

[54] ALTERNATOR VOLTAGE REGULATOR HAVING AUXILLIARY EXCITATION MEANS
4 Claims, 6 Drawing Figs.

[52] U.S. Cl. ............... 322/28,
322/36, 322/60, 322/73
[51] Int. Cl. ............... H02p 9/30
[50] Field of Search........... 322/28, 36, 60, 73, 27, 25

[56] References Cited
UNITED STATES PATENTS

| 3,378,753 | 4/1968 | Poppinger et al | 322/60 X |
| 3,435,326 | 3/1969 | Zechlin | 322/25 |
| 3,521,148 | 7/1970 | Kirk et al | 322/28 |

Primary Examiner—Oris L. Rader
Assistant Examiner—H. Huberfeld
Attorney—Sommers and Young ABSTRACT: Apparatus for regulating the field current of an alternator comprises a negative feedback circuit and thyristor means by which the field current is turned on and off, wherein auxiliary, sensitive, thyristors which are capable of functioning at the low alternator voltages produced by residual magnetism on starting are provided in shunt with main thyristors which take over when the alternator voltage has built up.

ALTERNATOR VOLTAGE REGULATOR HAVING AUXILLIARY EXCITATION MEANS

This invention concerns improvements relating to the regulation of alternators, particularly but not exclusively alternators which provide current for charging a battery, as well as supplying a main-load current, as for example in an installation supplying a railway vehicle.

It is an object of the invention to provide static regulating means for this purpose which will be free from disadvantages associated with known alternator-exciting systems. More particularly it seeks to provide regulating means which is capable of functioning correctly on the very low voltages which are produced, on the starting up of an alternator, by the residual magnetism, say of the order of one-half volt, and is also capable of withstanding high voltage transients due to load switching on the alternator. It is a further object of the invention to obviate the disadvantage of some known regulating means that they are slow in response, due commonly to the inclusion of a "free-wheel" diode connected across the field winding of the alternator. Reduced response time results in less risk of damage to auxiliary equipment in the system arising from its exposure to prolonged high voltage.

According to the present invention, in apparatus for regulating the field current of an alternator comprising a negative feedback circuit and thyristor means by which the field current is turned on and off, auxiliary, sensitive, thyristors which are capable of functioning at the low alternator voltages produced by residual magnetism on starting are provided in shunt with main thyristors which take over when the alternator voltage has built up.

The thyristors may be arranged to be fired by signals provided by an oscillator as long as it is functioning, such functioning being controlled in dependence upon sensed values of the alternator voltage, main-load current and/or battery-charging current and preferably in dependence upon all three of these factors.

For reducing the response time of the regulating apparatus, use may be made of a Zener diode arranged so that the field is allowed to regenerate through it when the field current is turned off or by means which forces the field current to decay more rapidly by the application of a reversed voltage. This may be achieved by allowing the thyristor means to conduct during the negative half cycles of the alternator voltage.

Figure 1A:
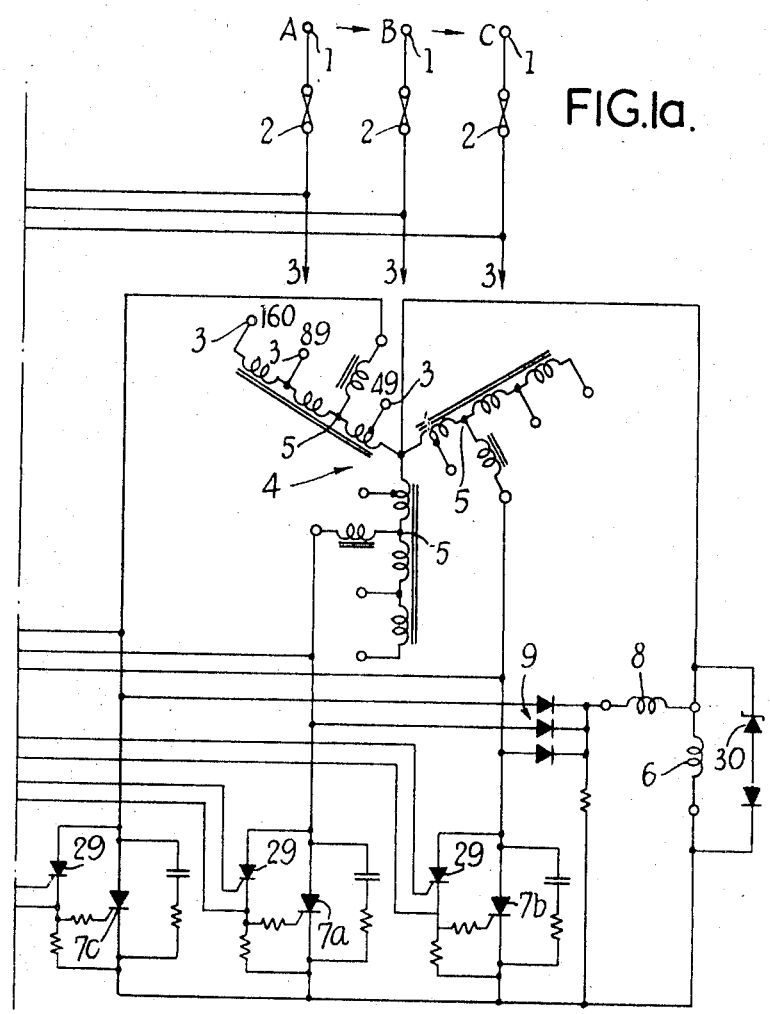
Figure 2:
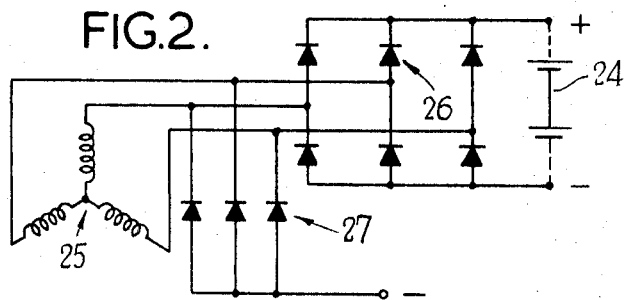
Figure 3:
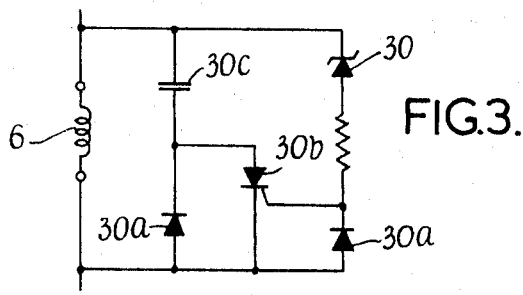
Figure 5:
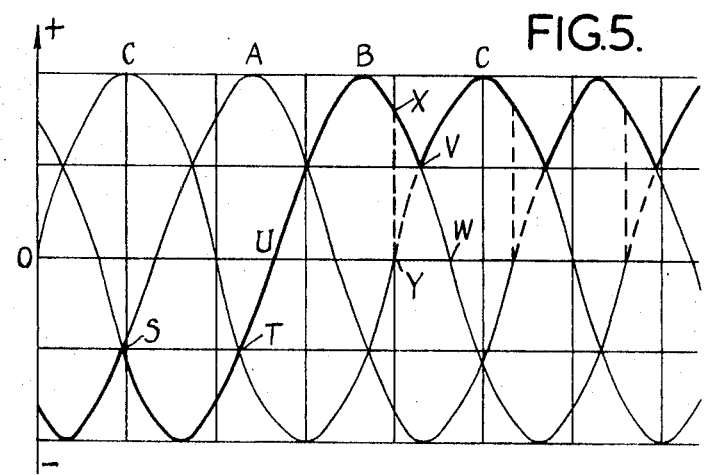
Figure 4:
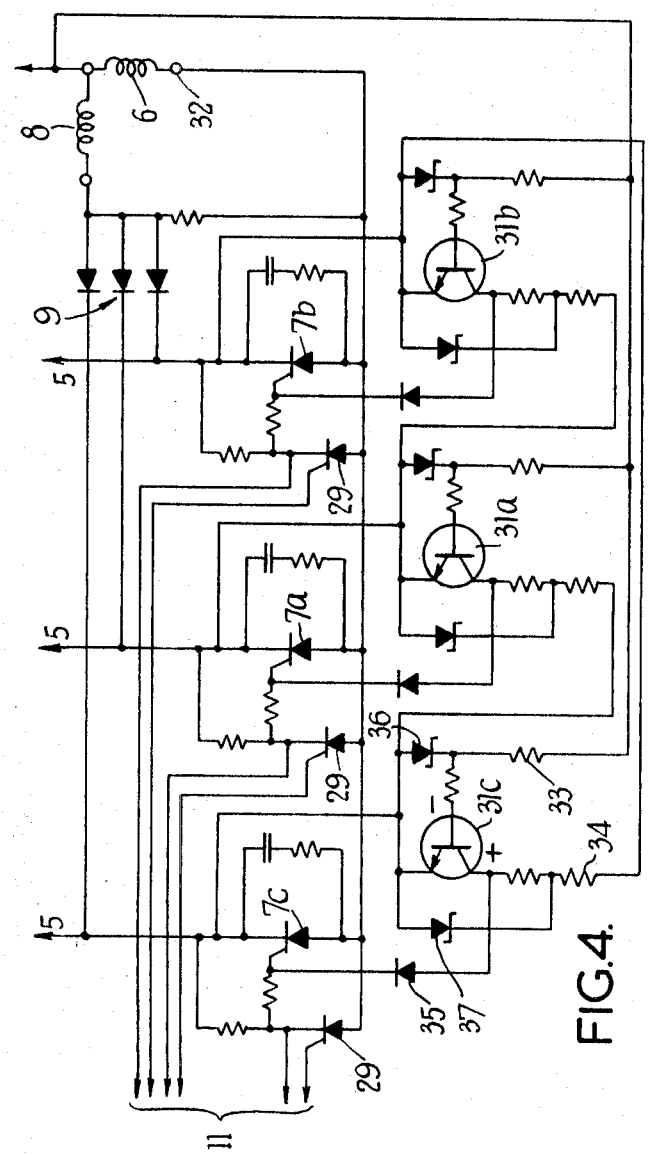

Preferred embodiments of the invention will now be more fully described by way of example with reference to the accompanying drawings, in which:

FIGS. 1 and 1a are together a circuit diagram illustrating apparatus for regulating the excitation of an alternator, FIG. 2 is a detail diagram illustrating a battery-charging circuit, FIG. 3 is a diagram illustrating a modification, FIG. 4 is a circuit diagram showing an alternative form of part of the circuit shown in FIG. 1, and FIG. 5 is an explanatory waveform diagram.

With reference to FIGS. 1 and 1a, three-phase power from the alternator (not shown) is supplied to the regulating apparatus at 1 (with the direction of phase rotation A-B-C indicated) via three input fuses 2 and is applied by way of selected combinations of input tappings 3 (corresponding such tappings being indicated by 49, 89 and 160) to the respective windings of an auto-transformer 4. The output is taken by way of tappings 5 and is supplied to the main field 6 of the alternator by way of three thyristors 7a—c, which are arranged to be normally in the nonconducting state. By appropriate selection of the tappings 3, the secondary voltage of the transformer is arranged to be, say, approximately 30 volts. An unregulated demagnetizing field 8 designed in per se known manner, in combination with the main field 6, so that the range of excitation required by the machine can be provided by the regulating means is supplied through three auxiliary diodes 9 also connected to the tappings 5.

Three further, negative, diodes 10 provide power for an oscillator 11 and a differential amplifier 12, the voltage supplied for the purpose being stabilized at 10 volts. The oscillator 11 provides continuous signals for firing the thyristors 7 by way of the output windings of a small pulse transformer 13. The thyristor will therefore conduct and pass current to the main field 6 as long as the oscillator 11 is functioning.

A potential-divider network 14 senses the output voltage of the alternator by way of negative diodes 15 and a small proportion of the voltage is fed to a Zener diode 16. The diode 16 is designed to conduct only when this proportional voltage reaches a predetermined value, say 15 volts. A transistor 17 connected across the oscillator 11 is then caused to conduct and to short circuit the latter, which ceases to function. No signals are passed to the thyristors 7, which revert to their nonconducting state, so that the supply to the main field 6 is interrupted. Thus the main-field excitation will be regulated by being turned off and on as the Zener diode 16 conducts and blocks respectively. The potential divider 14 is adjusted so that the diode 16 will just conduct when the desired output voltage, say 30 volts, of the alternator is attained.

The oscillator 11 is similarly controlled in dependence upon the value of the main-load current, which is sensed by means of a transformer 18 connected by way of a potential divider 19 and rectifier 20 to a Zener diode 21 which acts in relation to the transistor 17 similarly to the diode 16, but when the voltage applied to the said diode 21 reaches a predetermined value, say 30 volts, corresponding to a predetermined load current.

The oscillator 11 is also controlled in dependence on the value of the battery charging current. This is sensed by means of a shunt 22 connected between the battery positive and the positive diodes of a full-wave three-phase rectifier (not shown in FIGS. 1 and 1a) through which the charging current is supplied to the battery from the alternator. The voltage developed across the shunt 22 is amplified in the amplifier 12 and applied via a transistor 23 to the transistor 17. When the said voltage attains a predetermined value, corresponding to a required charging current, the transistor 17 is caused to conduct and the oscillator 11 to be turned off, as previously described.

FIG. 2 illustrates a suitable arrangement for supplying charging current to the battery 24 from the alternator by way of a transformer 25 and the full-wave rectifier 26. Auxiliary diodes 27 on the negative side prevent the battery from feeding back when the battery voltage exceeds the voltage supplied from the alternator.

It will be apparent that the above-described regulating means affords complete control of the alternator excitation in dependence upon alternator voltage, main-load current and battery-charging current. As between any two of these factor the control exercised is of the nature of dual regulation.

Compensation against errors resulting from changes in ambient temperature can be achieved by selection of the Zener diodes and auxiliary diodes, such as the diode 28, in series therewith, with temperature characteristics which will cancel out such errors. The amplifier 12 is inherently substantially insensitive to temperature changes.

The main thyristors 7a—c are capable normally of controlling the main field current. They are, however, incapable of passing current at the very low voltages available from residual magnetism when the alternator is started from rest. To obviate difficulty from this cause, the thyristors 7a—c are shunted respectively by three extremely sensitive thyristors 29. The circuit is arranged so that the thyristors 29 conduct until approximately 1 ampere is flowing, whereupon the thyristors 7a—c take over. The oscillator 11, which is of precise design, is arranged to start to function at approximately one-half volt, thus enabling the sensitive thyristors 29 to conduct and pass current to the field 6. Build up of the excitation can thus be achieved without other, complicated, circuitry.

The transformer 4 allows the regulating means to be set for any output voltage by selection or adjustment of its tappings.

If the type of load supplied is highly inductive, provision must be made to ensure that the current in conducting thyristors 7a—c, 29 is actually reduced to zero in order that they may be returned to the nonconducting state when required. The usual method of connecting a "free-wheel" diode across the field controlled results in prolongation of the period of current decay in the field and consequently in slow response. In the arrangement illustrated in FIGS. 1 and 1a, a Zener diode 30 is connected across the field 6 in such a way that the latter is allowed to regenerate through it. The conducting voltage for the diode 30 is chosen to be slightly less than the peak of the sinusoidal supply voltage. Accordingly, the field 6 will regenerate though the thyristors until the said voltage rises above the diode voltage, whereupon the field will discharge through the thyristors. The current through the thyristors will then fall to zero so that the latter revert to the nonconductive state. There is a resultant considerable reduction in the decay period.

The combination of the Zener diode 30 with a diode as shown in FIGS. 1 and 1a can be replaced by an alternative arrangement of a Zener diode in series with a capacitor or of a resistor having a negative resistance temperature coefficient in series with a diode. A third alternative is shown in FIG. 3 in which two diodes 30a, a thyristor 30b and a capacitor 30c are connected as shown.

In an alternative thyristor/field circuit illustrated in FIG. 4, the Zener diode 30 is dispensed with in favour of an arrangement in which the field is caused to decay more rapidly by the application of a reversed supply voltage. With this arrangement in which the field is caused to decay more rapidly by the application of a reversed supply voltage. With this arrangement, each of the thyristors 7 is allowed to conduct during the negative half cycles of the supply, forcing the regenerative field current to decay. For this purpose, pulses for firing respective thyristors 7a—c are provided by three identical logic circuits, each comprising a transistor 31, which sense, in very simple manner, the required moment for firing.

The effect will be apparent from FIG. 5 in which the voltage waveforms for the three phases of the voltage supplied by the alternator are shown. When the thyristors 7a—c are conducting normally, the voltage developed at the point 32 is as shown in heavy lines on the left of FIG. 5. The negative polarity is due to the way the thyristors 7a—c are connected. If power is removed from the point 32, then because the field is inductive it will try to maintain current flow in the same direction. A voltage will therefore be generated by the field which will reach a high value in order to keep the current flowing. This current will flow through any path which offers least resistance and in this case will be one of the thyristors 7a—c. It would therefore not be possible to turn off all the thyristors.

In FIG. 5 it is clear that phase B of the supply takes over from phase A, at point 'S' on the waveform, to keep the supply of power going. Similarly at point 'T,' phase C should take over conduction, but if this does not occur then point 'U' and subsequent point 'V' will be reached. At point 'B,' if phase C does not take over conduction, point 'W' would be reached and power would again flow to the field. To prevent this, phase C takes over from phase B just before point 'V' is reached, i.e. at point 'X' for example. It is therefore necessary to fire the thyristor 7c of phase C at point 'X' whereupon the actual conduction jumps to point 'Y' and then continues up to point 'V' (as shown by a broken line) and so on.

At point 'X,' phase B is positive and the neutral is negative with reference to the phase C voltage. This is a unique arrangement of potentials and only occurs between points 'X' and 'V.'

Thus with a simple detecting network which only gives an output when this unique arrangement occurs, the thyristor 7c on phase C can be fired between points 'X' and 'V' and so pass conduction from phase B to phase C before point 'V' is reached.

An example of such a network is shown in FIG. 4 in which the circuit associated with the transistor 31c will be described. The potential of the neutral point appears at the bottom end of resistor 33 and of the phase B at the bottom of resistor 34. The reference potential, in this case phase C, is connected to the emitter of the transistor 31c. When the potential of the neutral and of phase B is negative and positive respectively with respect to phase C, the thyristor 7c is caused to fire, the signal to the gate electrode being passed through a diode 35.

A Zener diode 36 acts as a protection to limit the forward and reverse voltage applied to the base of the transistor 31c and a Zener diode 37 limits the forward and reverse voltage applied to the transistor and to the gate circuit of the thyristor 7c.

In a similar manner, thyristor 7a is fired when the neutral is negative and phase C is positive with respect to phase A, and thyristor 7b when the neutral is negative and phase A is positive with respect to phase B.

I claim:

1. Apparatus for regulating the field current of an alternator comprising,
a negative feedback circuit,
main thyristors by which the field current is turned on and off,
auxiliary sensitive thyristors which are capable of functioning at the low alternator voltages produced by residual magnetism on starting of the alternator and which are arranged in shunt with said main thyristors which take over when the alternator voltage has built up,
and, for reducing the response time of the apparatus, a Zener diode so connected to the field that the latter can regenerate through the said diode when the field current is turned off.

2. Apparatus for regulating the field current of an alternator comprising,
a negative feedback circuit,
main thyristors by which the field current is turned on and off,
auxiliary sensitive thyristors which are capable of functioning at the low alternator voltages produced by residual magnetism on starting of the alternator and which are arranged in shunt with said main thyristors which take over when the alternator voltage has built up,
and, for reducing the response time of the apparatus, means forcing the field current to decay rapidly by the application of a reversed voltage.

3. Apparatus as claimed in claim 2, wherein the thyristors are allowed to conduct during the negative half cycles of the alternator voltage.

4. Apparatus as claimed in claim 2, wherein the thyristors are fired by pulses supplied by three logic circuits arranged to sense the required moment for firing.